(12) United States Patent
Min et al.

(10) Patent No.: US 8,137,227 B2
(45) Date of Patent: Mar. 20, 2012

(54) POWER TRANSMITTING APPARATUS OF HYBRID VEHICLES

(75) Inventors: Byungsoon Min, Gyeonggi-do (KR); Jongsool Park, Gyeonggi-do (KR); Chanhyuk Song, Seoul (KR); Chang Wook Lee, Gyeonggi-do (KR); Tal-Chol Kim, Incheon (KR)

(73) Assignee: Hyundai Motor Company, Seoul (KR)

( * ) Notice: Subject to any disclaimer, the term of this patent is extended or adjusted under 35 U.S.C. 154(b) by 745 days.

(21) Appl. No.: 12/271,306

(22) Filed: Nov. 14, 2008

(65) Prior Publication Data
US 2009/0270213 A1    Oct. 29, 2009

(30) Foreign Application Priority Data

Apr. 28, 2008  (KR) .......................... 10-2008-0039489

(51) Int. Cl.
*F16H 3/72* (2006.01)
*F16H 37/06* (2006.01)
*B60K 1/00* (2006.01)

(52) U.S. Cl. .......................... 475/5; 180/65.7
(58) Field of Classification Search .......... 475/5; 477/3; 180/65.21, 65.225, 65.23, 65.24, 65.245, 180/65.25, 65.26, 65.6, 65.7
See application file for complete search history.

(56) References Cited

U.S. PATENT DOCUMENTS
7,192,373 B2 * 3/2007 Bucknor et al. .................. 475/5
* cited by examiner

*Primary Examiner* — David D Le
*Assistant Examiner* — Michael Gonzalez
(74) *Attorney, Agent, or Firm* — Edwards Wildman Palmer LLP; Peter F. Corless (57) ABSTRACT

A power transmitting apparatus of hybrid vehicles that transmits torque from an engine and first and second motor/generators to an output shaft is provided. The apparatus may include: a first planetary gear set having a first operating member fixedly connected to the second motor/generator, a second operating member selectively connected to the first operating member, and a third operating member; and a second planetary gear set having a fourth operating member fixedly connected to the engine and selectively connected to the second operating member, a fifth operating member fixedly connected to the first motor/generator and selectively connected to the second operating member, and a sixth operating member fixedly connected to the third operating member and the output shaft. With the apparatus, fuel efficiency can be remarkably improved.

8 Claims, 11 Drawing Sheets

FIG.1

PRIOR ART

FIG.2

PRIOR ART

FIG.3

PRIOR ART

FIG.4

PRIOR ART

POWER TRANSMITTING APPARATUS OF HYBRID VEHICLES

CROSS-REFERENCE TO RELATED APPLICATION

This application claims priority to and the benefit of Korean Patent Application No. 10-2008-0039489 filed on Apr. 28, 2008, the entire contents of which are incorporated herein by reference.

BACKGROUND (a) Technical Field

The present invention relates to hybrid vehicles. More particularly, the present invention relates to a power transmitting apparatus of hybrid vehicles.

(b) Related Art

A hybrid vehicle means a vehicle driven by at least two different energy sources. Mostly, a hybrid vehicle is called a hybrid electric vehicle which includes an engine using fuel and an electric motor using electricity in order to generate power.

Since such a hybrid vehicle uses power of the engine as a main energy source and power of the motor as an auxiliary energy source, a conversion ratio of mechanical energy into electrical energy is low and power delivery efficiency is very high.

Figure 1:
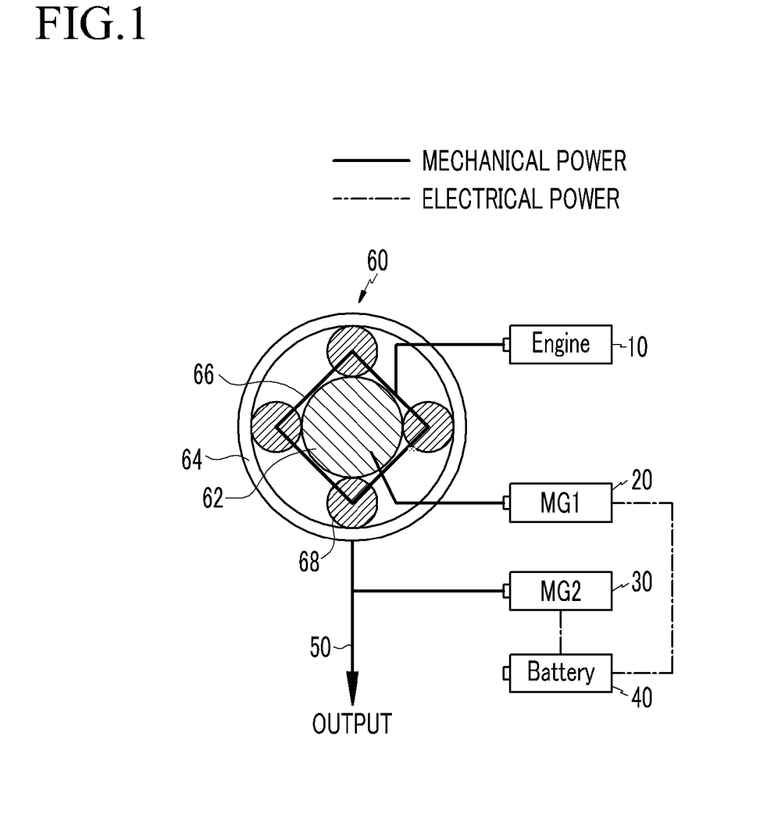
FIG. 1 is a schematic diagram showing an exemplary conventional power transmitting apparatus of hybrid vehicles.

FIG. 1 is a schematic diagram showing an exemplary conventional power transmitting apparatus of hybrid vehicles.

As shown in FIG. 1, an exemplary conventional power transmitting apparatus of hybrid vehicles includes an engine 10, first and second motor/generators 20 and 30, and a planetary gear set 60.

The engine 10 supplies combustion energy of the fuel as power. The first and second motor/generators 20 and 30 are connected to a battery 40 respectively and supply power from the battery 40 or recharge the battery 40 by means of regenerative braking.

The planetary gear set 60 includes a sun gear 62, a ring gear 64, a plurality of pinion gears 68 engaged to the sun gear 62 and the ring gear 64, and a planet carrier 66 rotatably supporting the plurality of pinion gears 68.

The sun gear 62 is fixedly connected to the first motor/generator 20, the ring gear 64 is fixedly connected respectively to the second motor/generator 30 and the output shaft 50, and the planet carrier 66 is fixedly connected to the engine 10.

Therefore, a vehicle provided with the exemplary conventional power transmitting apparatus can realize a hybrid mode where a vehicle drives with power received from the engine 10 and the first and second motor/generators 20 and 30. In this case, various shift speeds can be continuously realized by controlling the first and second motor/generators 20 and 30.

Figure 2:
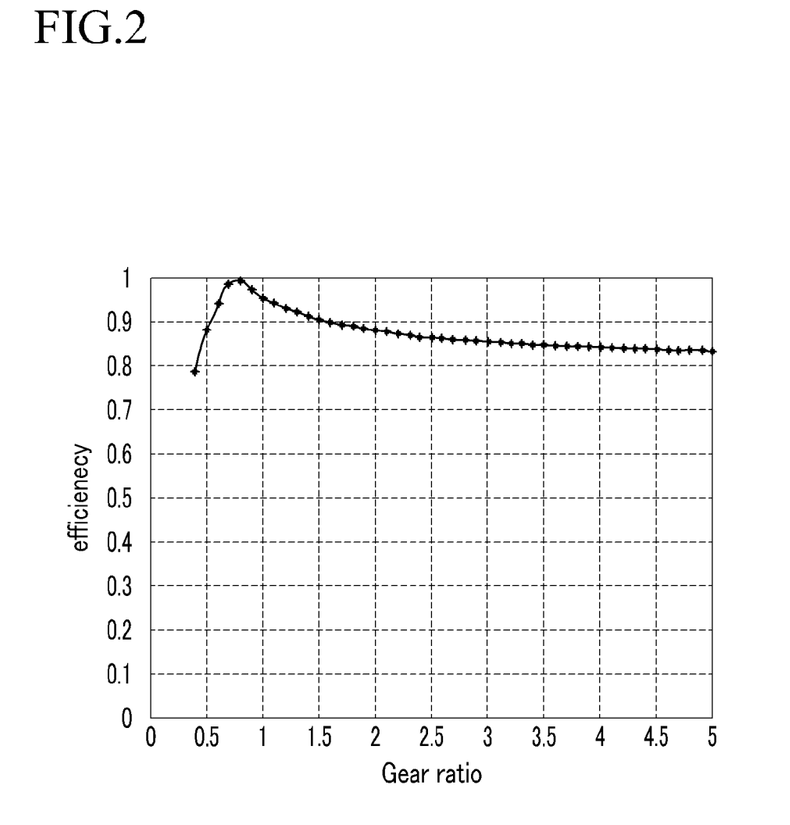
FIG. 2 is a graph showing efficiency of a hybrid vehicle provided with the power transmitting apparatus shown in FIG. 1.

Since the hybrid vehicle provided with such a conventional power transmitting apparatus, as shown in FIG. 2, supplies only one hybrid mode, maximum efficiency can be achieved near a gear ratio of 0.7 and efficiency may become deteriorated as the gear ratio increases higher than 0.7.

Figure 3:
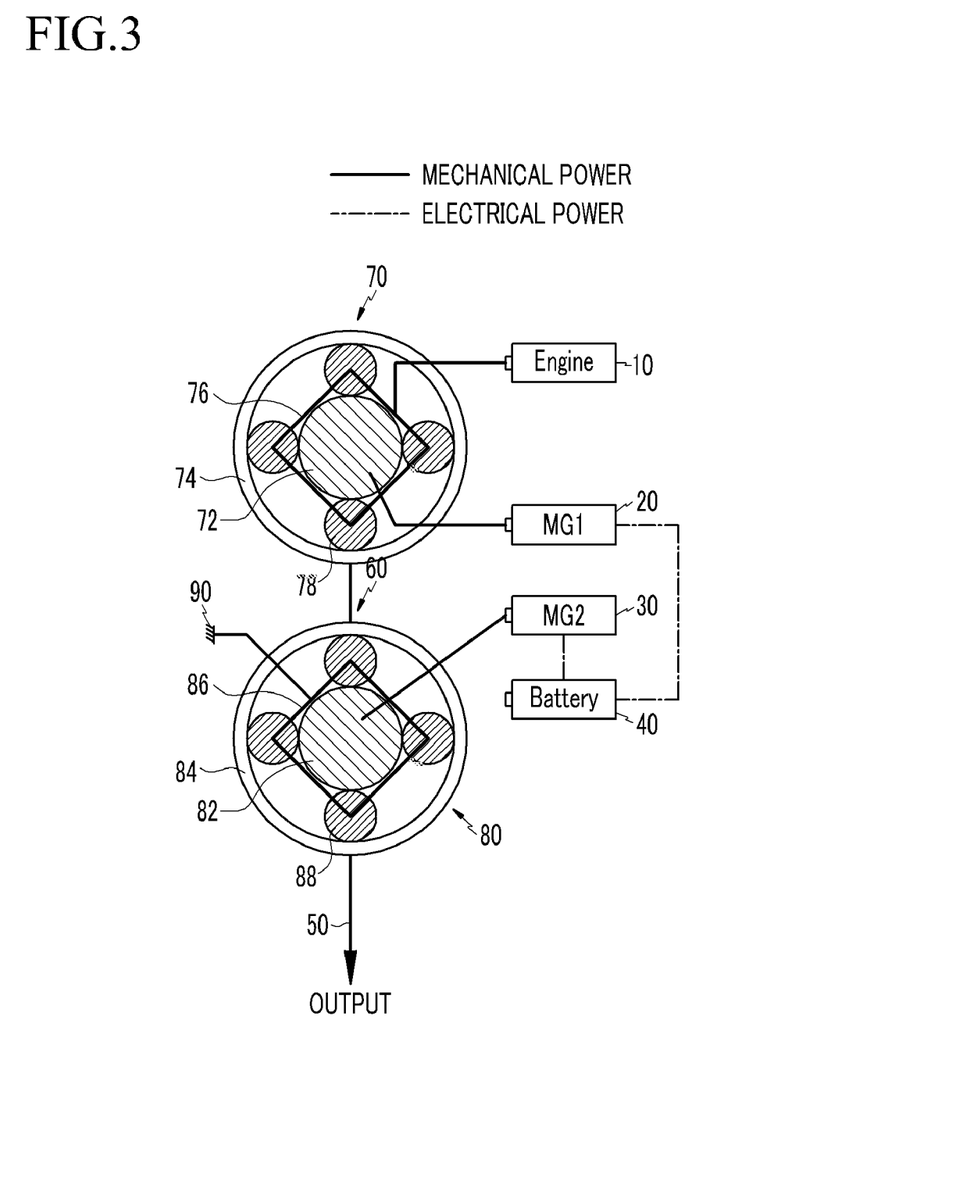
FIG. 3 is a schematic diagram showing another exemplary conventional power transmitting apparatus of hybrid vehicles.

FIG. 3 is a schematic diagram showing another exemplary conventional power transmitting apparatus of hybrid vehicles.

As shown in FIG. 3, another exemplary conventional power transmitting apparatus of hybrid vehicles includes an engine 10, first and second motor/generators 20 and 30, and first and second planetary gear sets 70 and 80.

The engine 10 supplies combustion energy of the fuel as power. The first and second motor/generators 20 and 30 are connected to a battery 40 respectively and supply power from the battery 40 or recharge the battery 40 by means of regenerative braking.

The first planetary gear set 70 includes a first sun gear 72, a first ring gear 74, a plurality of first pinion gears 78 engaged to the first sun gear 72 and the first ring gear 74, and a first planet carrier 76 rotatably supporting the plurality of first pinion gears 78.

The first sun gear 72 is fixedly connected to the first motor/generator 20, and the first planet carrier 76 is fixedly connected to the engine 10.

The second planetary gear set 80 includes a second sun gear 82, a second ring gear 84, a plurality of second pinion gears 88 engaged to the second sun gear 82 and the second ring gear 84, and a second planet carrier 86 rotatably supporting the plurality of second pinion gears 88.

The second sun gear 82 is fixedly connected to the second motor/generator 30, the second planet carrier 86 is fixedly connected to a transmission case 90, and the second ring gear 84 is fixedly connected respectively to the first ring gear 74 and an output shaft 50.

Therefore, a vehicle provided with this exemplary conventional power transmitting apparatus can realize a hybrid mode where a vehicle drives with power received simultaneously from the engine 10 and the first and second motor/generators 20 and 30. In this case, various shift speeds can be continuously realized by controlling the first and second motor/generators 20 and 30.

In addition, power transmitted from the second motor/generator 30 is transmitted to the output shaft through the second sun gear 82 and the second ring gear 84 according to the exemplary conventional power transmitting apparatus. In this process, the rotational speed of the second motor/generator 30 is reduced according to a teeth ratio of the second sun gear 82 to the second ring gear 84.

Therefore, this exemplary conventional power transmitting apparatus can acquire the same performance as the exemplary conventional power transmitting apparatus shown in FIG. 1 even if using the second motor/generator 30 of smaller capacity.

Figure 4:
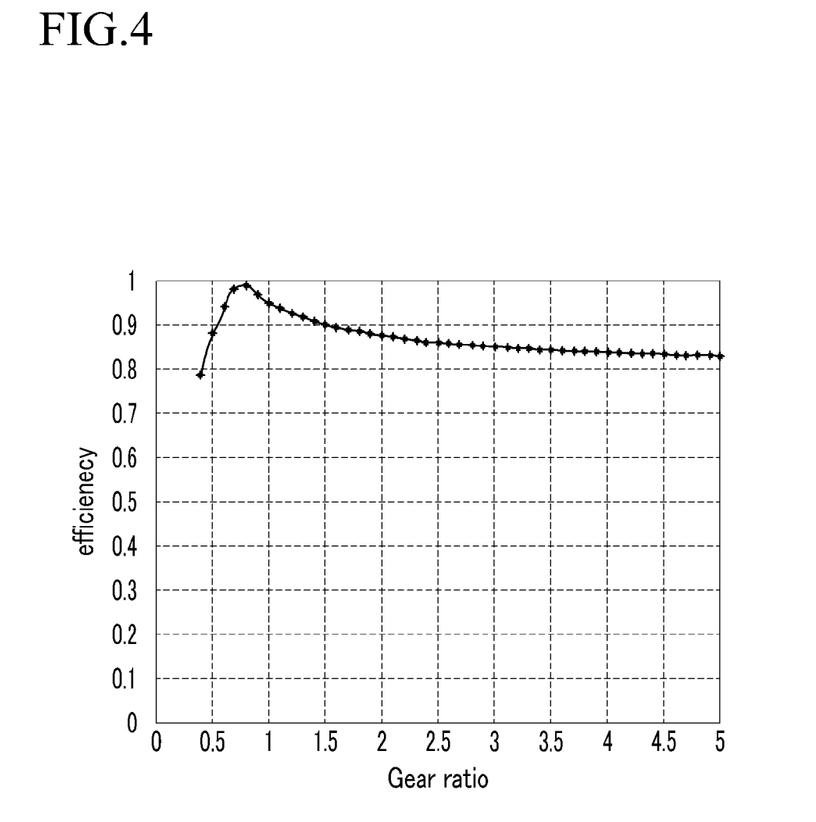
FIG. 4 is a graph showing efficiency of a hybrid vehicle provided with the power transmitting apparatus shown in FIG. 3.

However, a hybrid vehicle provided with the power transmitting apparatus shown in FIG. 3, as shown in FIG. 4, also supplies only one hybrid mode. Therefore, maximum efficiency can be achieved near a gear ratio of 0.7 and efficiency may become deteriorated as the gear ratio increases higher than 0.7.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a power transmitting apparatus of hybrid vehicles having advantages of realizing two hybrid modes, two engine modes, and one electric mode.

Power transmitting apparatuses of hybrid vehicles according to exemplary embodiments of the present invention may transmit torque from an engine and first and second motor/generators to an output shaft.

The power transmitting apparatus may include: a first planetary gear set including a first operating member fixedly connected to the second motor/generator, a second operating member selectively connected to the first operating member, and a third operating member; and a second planetary gear set having a fourth operating member fixedly connected to the engine and selectively connected to the second operating member, a fifth operating member fixedly connected to the first motor/generator and selectively connected to the second operating member, and a sixth operating member fixedly connected to the third operating member and the output shaft.

The first planetary gear set may be a single pinion planetary gear set including a first sun gear, a first planet carrier, and a first ring gear as operating members thereof, wherein the first sun gear is operated as the first operating member, the first planet carrier is operated as the second operating member, and the first ring gear is operated as the third operating member.

The second planetary gear set may be a single pinion planetary gear set having a second sun gear, a second planet carrier, and a second ring gear as operating members thereof, wherein the second sun gear is operated as the fourth operating member, the second planet carrier is operated as the sixth operating member, and the second ring gear is operated as the fifth operating member.

The power transmitting apparatus may further include: a first clutch selectively connecting the second operating member to the fifth operating member; a second clutch selectively connecting the first operating member to the second operating member; and a third clutch selectively connecting the second operating member to the fourth operating member.

The power transmitting apparatus may further include a brake selectively connecting the first operating member to a transmission case.

In the power transmitting apparatus of hybrid vehicles according to a first exemplary embodiment of the present invention, the second and third clutches may be disposed at the same side with reference to the second motor/generator.

In the power transmitting apparatus of hybrid vehicles according to a second exemplary embodiment of the present invention, the third clutch may be disposed on an opposite side to the second clutch with reference to the second motor/generator.

In the power transmitting apparatus of hybrid vehicles according to a third exemplary embodiment of the present invention, the third clutch may be disposed between the first and second planetary gear sets.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

DETAILED DESCRIPTION OF THE EMBODIMENTS

Exemplary embodiments of the present invention will hereinafter be described in detail with reference to the accompanying drawings.

Figure 5:
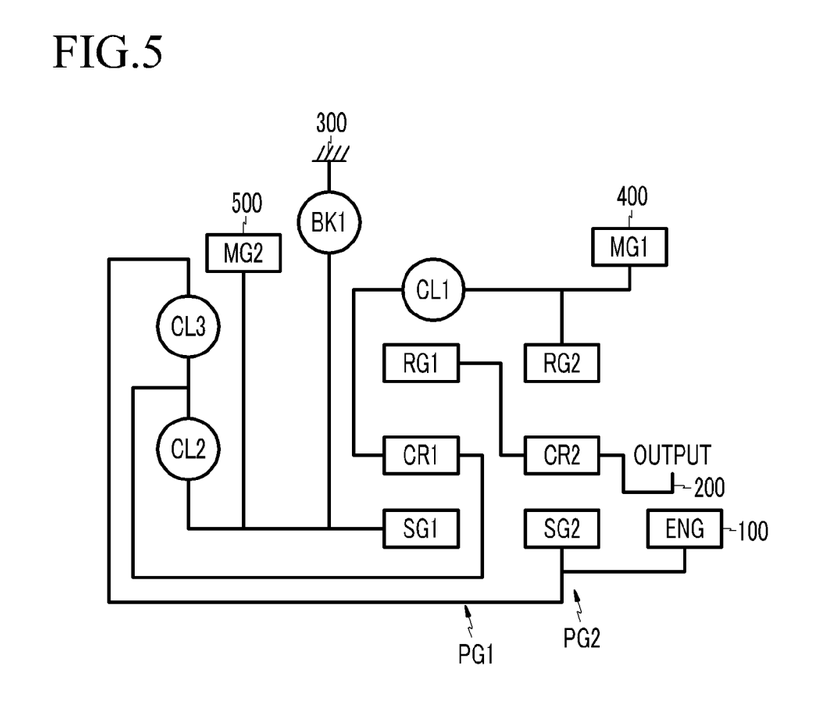
FIG. 5 is a schematic diagram of a power transmitting apparatus of hybrid vehicles according to a first exemplary embodiment of the present invention.

FIG. 5 is a schematic diagram of a power transmitting apparatus of hybrid vehicles according to a first exemplary embodiment of the present invention.

As shown in FIG. 5, a power transmitting apparatus of hybrid vehicles according to the first exemplary embodiment of the present invention includes an engine 100, an output shaft 200, a transmission case 300, first and second motor/generators 400 and 500, first and second planetary gear sets PG1 and PG2, first, second, and third clutches CL1, CL2, and CL3, and a brake BK1.

The engine 100 generates torque by burning fuel. Non-limiting examples of the engine 100 includes a gasoline engine, a diesel engine, a liquefied petroleum gas (LPG) engine, a methanol engine, and a hydrogen engine.

The output shaft 200 outputs torque from the power transmitting apparatus.

The first and second motor/generators 400 and 500 are connected to a battery (not shown), and supply torque from the battery or recharge the battery by means of regenerative braking.

The first planetary gear set PG1 is a single pinion planetary gear set, and includes a first sun gear SG1, a first planet carrier CR1, and a first ring gear RG1 as operating members thereof. In addition, the first planetary gear set PG1 includes a plurality of first pinion gears (not shown) engaged to the first sun gear SG1 and the first ring gear RG1, and the first planet carrier CR1 rotatably supports the plurality of first pinion gears.

The second planetary gear set PG2 is a single pinion planetary gear set, and includes a second sun gear SG2, a second planet carrier CR2, and a second ring gear RG2 as operating members thereof. In addition, the second planetary gear set PG2 includes a plurality of second pinion gears (not shown) engaged to the second sun gear SG2 and the second ring gear RG2, and the second planet carrier CR2 rotatably supports the plurality of second pinion gears.

According to the first exemplary embodiment of the present invention, the engine 100 is fixedly connected to the second sun gear SG2, the first motor/generator 400 is fixedly connected to the second ring gear RG2, and the second motor/generator 500 is fixedly connected to the first sun gear SG1.

In addition, the second planet carrier CR2 is fixedly connected respectively to the output shaft 200 and the first ring gear RG1.

The first planet carrier CR1 is selectively connected to the second ring gear RG2 by operation of the first clutch CL1, the first sun gear SG1 is selectively connected to the first planet carrier CR1 by operation of the second clutch CL2, and the second sun gear SG2 is selectively connected to the first planet carrier CR1 by operation of the third clutch CL3.

In addition, the first sun gear SG1 is selectively connected to the transmission case 300 by operation of the brake BK1.

In the power transmitting apparatus of hybrid vehicles according to the first exemplary embodiment of the present invention, the second and third clutches CL2 and CL3 are disposed on an opposite side to the brake BK1 and the first clutch CL1 with reference to the second motor/generator 500.

Hereinafter, each drive mode of a hybrid vehicle provided with the power transmitting apparatus according to the first exemplary embodiment of the present invention will be described in detail.

Electric Mode

When the second clutch CL2 is engaged, the first sun gear SG1 and the first planet carrier CR1 are connected to each other and all the operating members of the first planetary gear set PG1 rotate with the same rotational speed. If the torque of the second motor/generator 500 is input at this state, all the operating members of the first planetary gear set PG1 rotate with the same speed as the second motor/generator 500. Accordingly, the torque of the second motor/generator 500 is transmitted to the output shaft 200 through the second planet carrier CR2 fixedly connected to the first ring gear RG1. The gear ratio in the electric mode is 1.0.

In addition, since the second sun gear SG2 connected to the engine 100 is stopped, the first motor/generator 400 rotates faster than the second motor/generator 500.

Conversion from Electric Mode into First Hybrid Mode

If the rotational speed of the first motor/generator 400 is reduced in the electric mode, the engine 100 is started. In this case, since torque of the output shaft 200 is partially transmitted to the second planet carrier CR2 but the entire torque of the output shaft 200 does not change, impact does not occur by the engine starting.

If the rotational speed of the first motor/generator 400 is reduced to the rotational speed of the engine 100, the second clutch CL2 is released, and the first clutch CL1 is engaged in this state, the drive mode of the hybrid vehicle is converted into the first hybrid mode.

First Hybrid Mode

If the first clutch CL1 is engaged, the first planet carrier CR1 and the second ring gear RG2 are connected with each other and the second planet carrier CR2 and the first ring gear RG1 are connected with each other such that the first hybrid mode is realized.

In this case, various shift speeds can be continuously realized by controlling operations of the first and second motor/generators 400 and 500.

Figure 6:
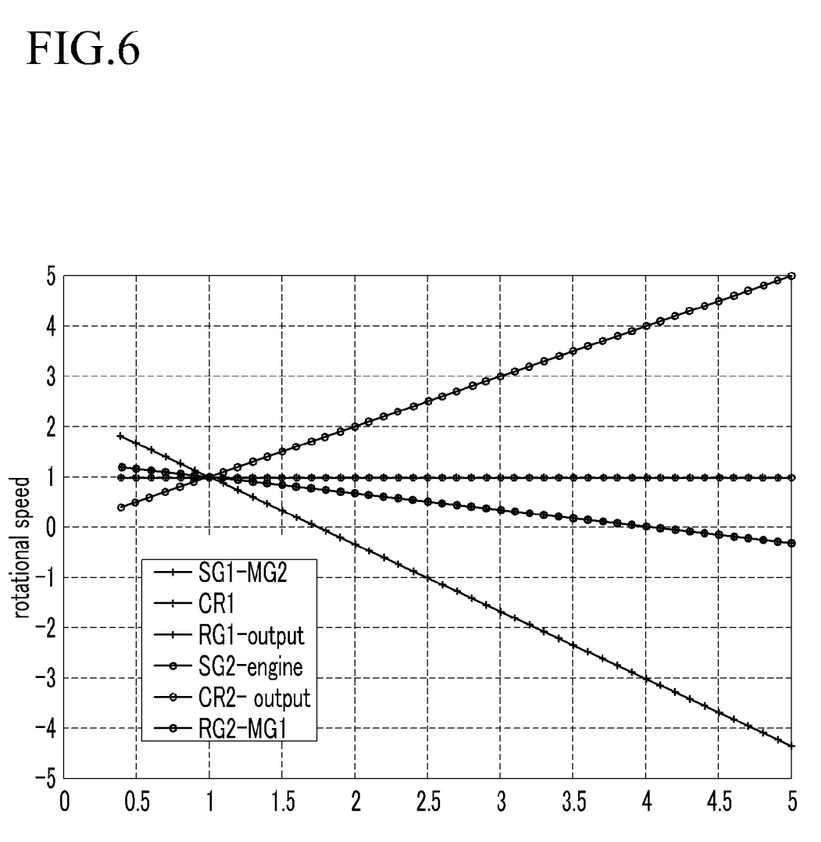
FIG. 6 is a graph showing rotational speed of each operating member in a case that a hybrid vehicle provided with the power transmitting apparatus shown in FIG. 5 drives in a first hybrid mode.

The rotational speed of each operating member at each gear ratio in the first hybrid mode is shown in FIG. 6.

Second Hybrid Mode

If the third clutch CL3 is engaged, the first planet carrier CR1 and the second sun gear SG2 are connected with each other and the first ring gear RG1 and the second planet carrier CR2 are connected with each other such that the second hybrid mode is realized.

In this case, various shift speeds can be continuously realized by controlling operations of the first and second motor/generators 400 and 500.

Figure 7:
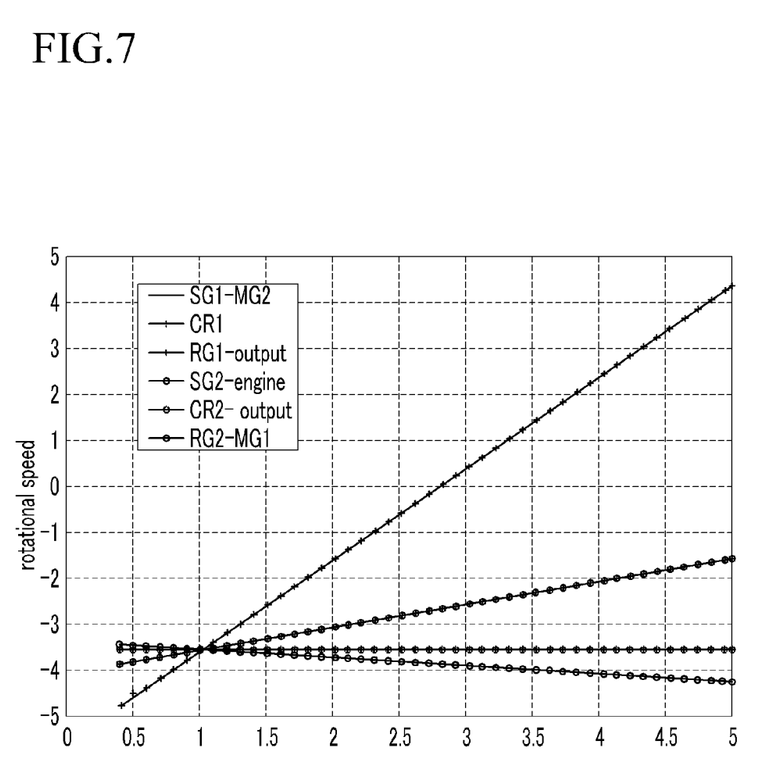
FIG. 7 is a graph showing rotational speed of each operating member in a case that a hybrid vehicle provided with the power transmitting apparatus shown in FIG. 5 drives in a second hybrid mode.

The rotational speed of each operating member at each gear ratio in the second hybrid mode is shown in FIG. 7.

Conversion Between First and Second Hybrid Mode

When the first sun gear SG1 selectively connected to the first planet carrier CR1 and the first ring gear RG1 rotate with the same rotational speed, conversion between the first and second hybrid modes can occur. Accordingly, with the gear ratio of 1.0, the first clutch CL1 is changed from an engaged state to a released state while the third clutch CL3 is changed from a released state to an engaged state or the first clutch CL1 is changed from a released state to an engaged state while the third clutch CL3 is changed from an engaged state to a released state.

First Engine Mode

If the third clutch CL3 is engaged, the first planet carrier CR1 and the second sun gear SG2 are connected with each other. In addition, if the brake BK1 is engaged, the first sun gear SG1 is stopped. Therefore, there is no use transmitting torque to the second motor/generator 500.

At this time, if the first motor/generator does not supply torque, the hybrid vehicle drives only with torque of the engine 100. Since the first planet carrier CR1 connected to the engine 100 rotates with a slower rotational speed than the first ring gear RG1 connected to the output shaft 200, the hybrid vehicle drives in overdrive state.

In a case where the vehicle drives with a high speed, since regeneration of power by means of regenerative braking is low, the motor must be driven by electricity that is generated by the generator. In this case, electrical energy is converted back into mechanical energy after the mechanical energy is converted into electrical energy, which may cause energy loss.

Therefore, it is advantageous that a vehicle is driven only by torque of the engine 100 in this state.

Second Engine Mode

If the second clutch CL2 and the third clutch CL3 are engaged, all the operating members of the first planetary gear set PG1 are locked and the gear ratio of 1.0 is realized. At this state, if torque of the first motor/generator MG1 is not supplied, torque is not transmitted to any of the operating members of the second planetary gear set PG2. Therefore, engine torque is transmitted only to the first planet carrier CR1 among the second sun gear SG2 and the first planet carrier CR1 connected with each other.

Figure 8:
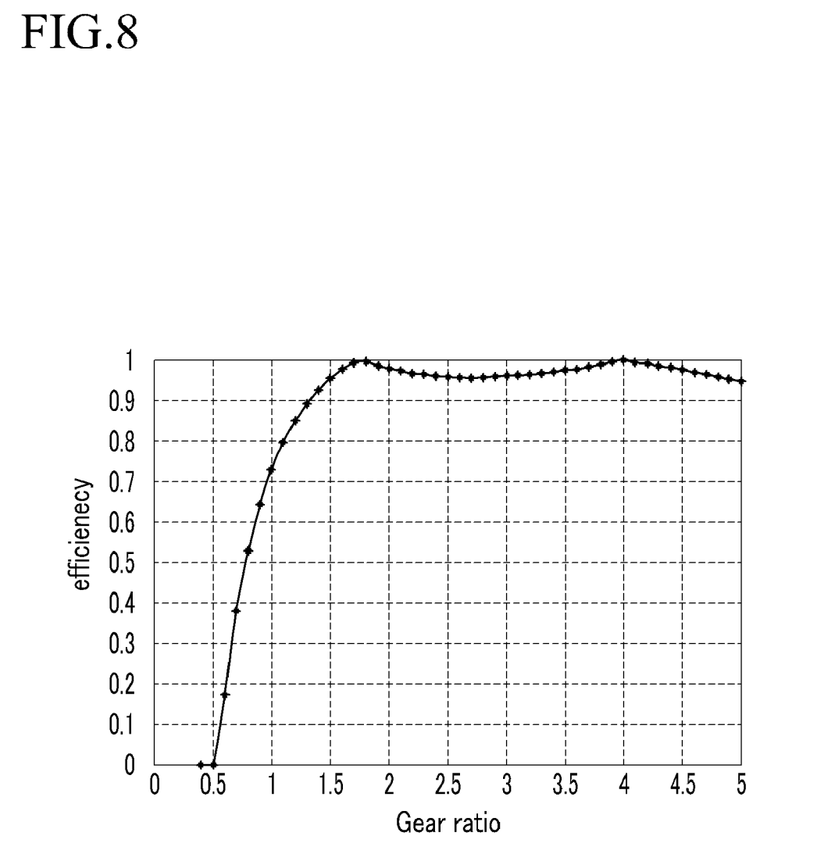
FIG. 8 is a graph showing efficiency in a case that a hybrid vehicle provided with the power transmitting apparatus shown in FIG. 5 drives in the first hybrid mode.
Figure 9:
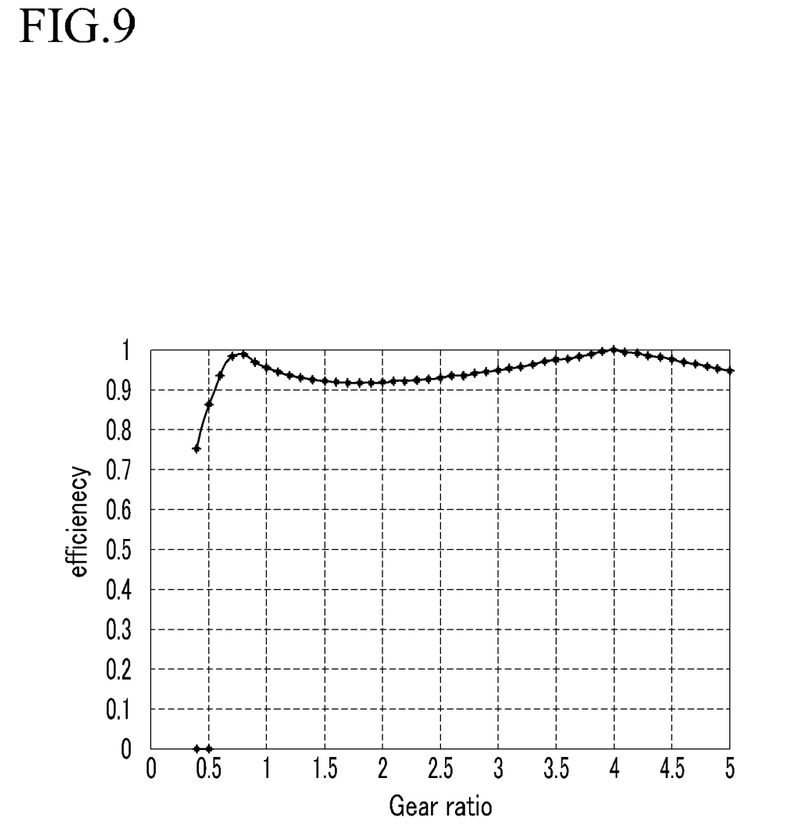
FIG. 9 is a graph showing efficiency in a case that a hybrid vehicle provided with the power transmitting apparatus shown in FIG. 5 drives in the second hybrid mode.

FIG. 8 is a graph showing efficiency in a case that a hybrid vehicle provided with the power transmitting apparatus shown in FIG. 5 drives in the first hybrid mode, and FIG. 9 is a graph showing efficiency in a case that a hybrid vehicle provided with the power transmitting apparatus shown in FIG. 5 drives in the second hybrid mode.

As shown in FIG. 8, in a case that the vehicle drives in the first hybrid mode, efficiency of the vehicle is very high near a gear ratio of 1.75 and 4.0.

In addition, in a case that the vehicle drives in the second hybrid mode, efficiency of the vehicle is very high near a gear ratio of 0.8 and 4.0, as shown in FIG. 9.

Therefore, fuel mileage may be enhanced by converting between the first hybrid mode and the second hybrid mode according to a running state of the vehicle.

Hereinafter, referring to FIG. 10 and FIG. 11, the second and third exemplary embodiments of the present invention will be described.

Figure 10:
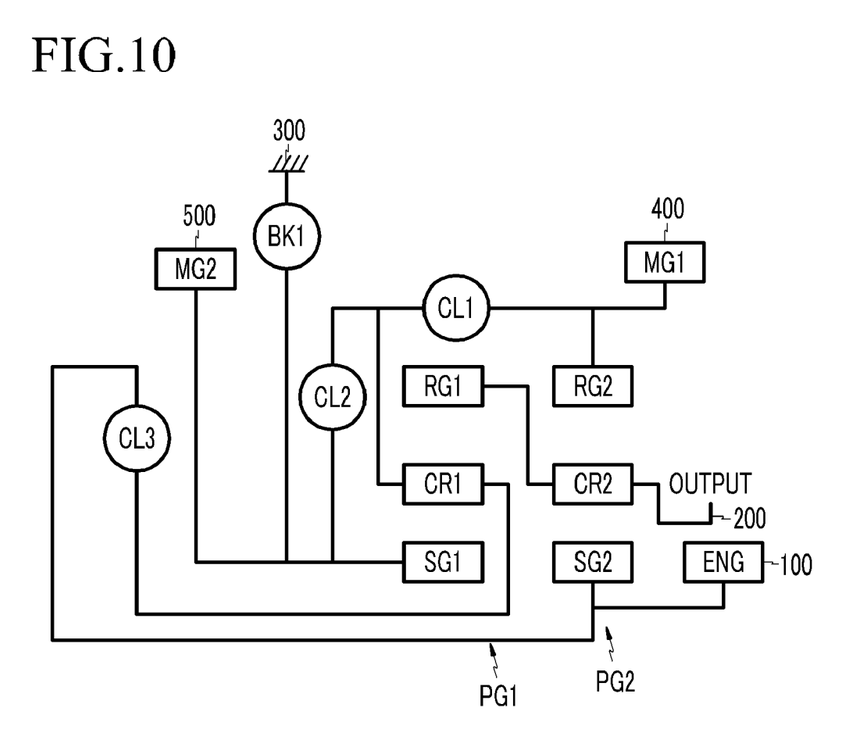
FIG. 10 is a schematic diagram of a power transmitting apparatus of hybrid vehicles according to a second exemplary embodiment of the present invention.
Figure 11:
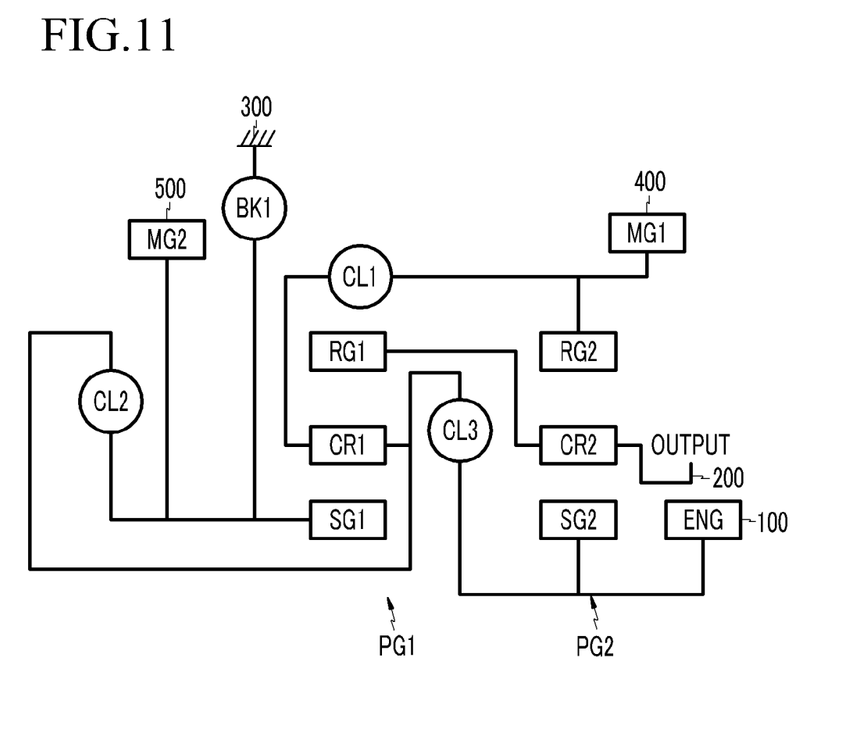
FIG. 11 is a schematic diagram of a power transmitting apparatus of hybrid vehicles according to a third exemplary embodiment of the present invention.

FIG. 10 is a schematic diagram of a power transmitting apparatus of hybrid vehicles according to the second exemplary embodiment of the present invention, and FIG. 11 is a schematic diagram of a power transmitting apparatus of hybrid vehicles according to the third exemplary embodiment of the present invention.

The power transmitting apparatus of hybrid vehicles according to the second and third exemplary embodiments of the present invention are similar to the power transmitting apparatus of hybrid vehicles according to the first exemplary embodiment of the present invention except for arrangements of the clutches CL1, CL2, and CL3.

As shown in FIG. 10, in the power transmitting apparatus of hybrid vehicles according to the second exemplary embodiment of the present invention, the third clutch CL3 is disposed on an opposite side to the brake BK1 and the first and second clutches CL1 and CL2 with reference to the second motor/generator 500.

As shown in FIG. 11, in the power transmitting apparatus of hybrid vehicles according to the third exemplary embodiment of the present invention, the second clutch CL2 is disposed on an opposite side to the brake BK1 and the first and third clutches CL1 and CL3 with reference to the second motor/generator 500. In addition, the third clutch CL3 is disposed between the first planetary gear set PG1 and the second planetary gear set PG2.

The power transmitting apparatus of hybrid vehicles according to exemplary embodiments of the present invention provide advantages including the following. It is possible to provide two hybrid modes, two engine modes, and one electric mode by using two planetary gear sets, three clutches, and one brake in a simple manner. No impact occurs when an engine is started in a state of the electric mode or when conversion between the electric mode and the hybrid mode occurs. Since an engine may not be started even if a driver turns on an ignition key, fuel is not consumed and noise may not occur due to exhaust and combustion in a state that a vehicle moves with low speed. Fuel mileage may be enhanced since two hybrid modes are suitably conversed according to the running state of a vehicle.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power transmitting apparatus of hybrid vehicles that transmits torque from an engine and first and second motor/generators to an output shaft, comprising:
    a first planetary gear set having a first operating member fixedly connected to the second motor/generator, a second operating member selectively connected to the first operating member, and a third operating member; and
    a second planetary gear set having a fourth operating member fixedly connected to the engine and selectively connected to the second operating member, a fifth operating member fixedly connected to the first motor/generator and selectively connected to the second operating member, and a sixth operating member fixedly connected to the third operating member and the output shaft.

2. The power transmitting apparatus of claim 1, wherein the first planetary gear set is a single pinion planetary gear set including a first sun gear, a first planet carrier, and a first ring gear as operating members thereof, and
    wherein the first sun gear is operated as the first operating member, the first planet carrier is operated as the second operating member, and the first ring gear is operated as the third operating member.

3. The power transmitting apparatus of claim 2, wherein the second planetary gear set is a single pinion planetary gear set including a second sun gear, a second planet carrier, and a second ring gear as operating members thereof, and
    wherein the second sun gear is operated as the fourth operating member, the second planet carrier is operated as the sixth operating member, and the second ring gear is operated as the fifth operating member.

4. The power transmitting apparatus of claim 1, further comprising:
    a first clutch selectively connecting the second operating member to the fifth operating member;
    a second clutch selectively connecting the first operating member to the second operating member; and
    a third clutch selectively connecting the second operating member to the fourth operating member.

5. The power transmitting apparatus of claim 4, further comprising a brake selectively connecting the first operating member to a transmission case.

6. The power transmitting apparatus of claim 4, wherein the second and third clutches are disposed at the same side with reference to the second motor/generator.

7. The power transmitting apparatus of claim 4, wherein the third clutch is disposed on an opposite side to the second clutch with reference to the second motor/generator.

8. The power transmitting apparatus of claim 7, wherein the third clutch is disposed between the first and second planetary gear sets.

* * * * *